United States Patent Office.

JOHN RUTHERFORD ANDERSON, OF MACON, GEORGIA.

VETERINARY REMEDY.

SPECIFICATION forming part of Letters Patent No. 423,893, dated March 25, 1890.

Application filed January 2, 1890. Serial No. 335,659. (No specimens.)

*To all whom it may concern:*

Be it known that I, JOHN RUTHERFORD ANDERSON, a citizen of the United States, residing at Macon, in the county of Bibb and State of Georgia, have invented a new and useful Veterinary Remedy; and I do hereby declare the following to be a full, clear, and exact description of the invention, such will enable others skilled in the art to which it appertains to make and use the same.

This composition is intended for hypodermic use in cattle and horses suffering from spasmodic ailments, such as bilious or flatulent colic, calculus, and paresis or intestinal obstruction, pulmonary congestion, azoturia, reflex cerebral disorders, acute indigestion, (hoven,) parturient apoplexy, and the like.

My composition is as follows: eserine salicylate, one and one-half grain; pilocarpine nitrate, two grains; saturated solution of boracic acid, two drams. It is formed as follows: Take distilled water at 100° Fahrenheit and add boracic acid until it is no longer dissolved. Allow this solution to stand six to twelve hours, decant, and filter. Then add the salts in the proportions given above. The amount above named—viz., two drams—forms one dose to be given a full-grown animal in the diseases named, and should be reduced for colts or calves.

Instead of pilocarpine nitrate, I may use pilocarpine hydrochloride, two grains, in the above formula; and I have found this latter salt to give good results in practice.

It has been heretofore sought to prepare such a mixture for hypodermic use with other salts of these alkaloids; but the solutions invariably decomposed and became unsafe for use in a very short time. My solution is practically permanent and affords to the veterinarian a safe, ready, and effective agent for treatment of the maladies before mentioned.

What I claim, and desire to secure by Letters Patent, is—

The herein-described veterinary remedy for the diseases named, consisting of eserine salicylate, pilocarpine nitrate, (or equivalent,) and saturated watery solution of boracic acid, in proportions substantially as specified.

In testimony whereof I affix my signature in presence of two witnesses.

JOHN RUTHERFORD ANDERSON.

Witnesses:
EDSON H. WYATT,
SAMUEL F. McKELVEY.